United States Patent
Cozzo et al.

(10) Patent No.: US 9,461,795 B2
(45) Date of Patent: Oct. 4, 2016

(54) SYSTEMS AND METHODS FOR SCHEDULING MULTIPLE-INPUT AND MULTIPLE-OUTPUT (MIMO) HIGH-SPEED DOWNLINK PACKET ACCESS (HSDPA) PILOT CHANNELS

(71) Applicant: Futurewei Technologies, Inc., Plano, TX (US)

(72) Inventors: Carmela Cozzo, San Diego, CA (US); Zongjie Wang, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/523,316

(22) Filed: Oct. 24, 2014

(65) Prior Publication Data
US 2015/0043506 A1 Feb. 12, 2015

Related U.S. Application Data

(63) Continuation of application No. 13/629,280, filed on Sep. 27, 2012, now Pat. No. 8,885,590.

(60) Provisional application No. 61/648,961, filed on May 18, 2012.

(51) Int. Cl.
*H04W 4/00* (2009.01)
*H04L 5/00* (2006.01)
(Continued)

(52) U.S. Cl.
CPC ........... *H04L 5/0048* (2013.01); *H04B 7/0413* (2013.01); *H04L 1/0027* (2013.01);
(Continued)

(58) Field of Classification Search
None
See application file for complete search history.

(56) References Cited

U.S. PATENT DOCUMENTS

2001/0043642 A1  11/2001  Hirata
2004/0058687 A1  3/2004  Kim et al.
(Continued)

FOREIGN PATENT DOCUMENTS

CN  101754232 A  6/2010
CN  102142880 A  8/2011
(Continued)

OTHER PUBLICATIONS

"3rd Generation Partnership Project; Technical Specification Group Radio Access Network; Multiplexing and channel coding (FDD) (Release 11)," 3GPP TS 25.212 V11.4.0, Dec. 2012, 161 pages.
(Continued)

*Primary Examiner* — Otis L Thompson, Jr.
(74) *Attorney, Agent, or Firm* — Slater Matsil, LLP

(57) ABSTRACT

Transitioning from basic higher order MIMO channel estimation to enhanced higher order MIMO channel estimation (and vice-versa) can be accomplished through the signaling of high-speed downlink packet access (HSDPA) shared control channel (HS-SCCH) orders to next-generation user equipments (UEs). A base station can be configured to send an HS-SCCH order indicating activation of scheduled pilot channels, and then begin transmitting the scheduled pilot channels after receiving an ACK message from at least one next-generation UE. A base station can also be configured to send an HS-SCCH order indicating de-activation of scheduled pilot channels to next-generation UEs scheduled for downlink transmission, and then stop transmitting the scheduled pilot channels after receiving ACK messages from each next-generation UE. Alternatively, scheduled pilot channels may be activated/de-activated without receiving an ACK message from some or all of the next-generation UEs scheduled for downlink transmission.

19 Claims, 8 Drawing Sheets

(51) Int. Cl.

| | | |
|---|---|---|
| *H04L 1/00* | (2006.01) | |
| *H04L 1/06* | (2006.01) | |
| *H04W 72/04* | (2009.01) | |
| *H04B 7/04* | (2006.01) | |
| *H04L 25/02* | (2006.01) | |
| *H04W 72/12* | (2009.01) | |
| *H04W 74/00* | (2009.01) | |
| *H04W 48/08* | (2009.01) | |
| *H04B 7/06* | (2006.01) | |

(52) U.S. Cl.
CPC .............. *H04L 1/06* (2013.01); *H04L 5/005* (2013.01); *H04L 25/0206* (2013.01); *H04L 25/0226* (2013.01); *H04W 72/04* (2013.01); *H04B 7/0623* (2013.01); *H04W 48/08* (2013.01); *H04W 72/12* (2013.01); *H04W 74/006* (2013.01)

(56) References Cited

U.S. PATENT DOCUMENTS

| | | |
|---|---|---|
| 2004/0125766 A1 | 7/2004 | Takano et al. |
| 2005/0254463 A1 | 11/2005 | Suzuki et al. |
| 2006/0013341 A1 | 1/2006 | Suzuki |
| 2007/0070944 A1 | 3/2007 | Rinne et al. |
| 2007/0097918 A1 | 5/2007 | Cai et al. |
| 2007/0104150 A1 | 5/2007 | Fernandez-Corbaton et al. |
| 2007/0133479 A1 | 6/2007 | Montojo et al. |
| 2008/0175196 A1 | 7/2008 | Jen |
| 2008/0194283 A1 | 8/2008 | Chaponniere |
| 2008/0261599 A1 | 10/2008 | Mohanty et al. |
| 2009/0046667 A1 | 2/2009 | Pelletier et al. |
| 2009/0201871 A1 | 8/2009 | Sambhwani et al. |
| 2009/0245212 A1 | 10/2009 | Sambhwani et al. |
| 2009/0257387 A1 | 10/2009 | Gholmieh et al. |
| 2009/0257421 A1* | 10/2009 | Nakashima et al. .......... 370/345 |
| 2009/0296563 A1 | 12/2009 | Kishiyama et al. |
| 2010/0034176 A1 | 2/2010 | Heo |
| 2010/0097937 A1 | 4/2010 | Pietraski et al. |
| 2010/0130137 A1 | 5/2010 | Pelletier et al. |
| 2010/0165835 A1 | 7/2010 | Hsu et al. |
| 2010/0202432 A1 | 8/2010 | Dai |
| 2010/0322333 A1 | 12/2010 | Goransson et al. |
| 2011/0026462 A1 | 2/2011 | Montojo et al. |
| 2011/0044292 A1 | 2/2011 | Eravelli et al. |
| 2011/0096727 A1 | 4/2011 | Bergman |
| 2011/0116530 A1 | 5/2011 | Sambhwani |
| 2012/0082192 A1 | 4/2012 | Pelletier et al. |
| 2012/0088512 A1 | 4/2012 | Yamada et al. |
| 2012/0196637 A1 | 8/2012 | Bergman et al. |
| 2012/0201319 A1* | 8/2012 | Asplund .............. H04B 7/0413 375/267 |
| 2012/0230320 A1 | 9/2012 | Kishiyama et al. |
| 2012/0287869 A1 | 11/2012 | Xi et al. |
| 2013/0044663 A1 | 2/2013 | Mohan et al. |
| 2013/0070609 A1 | 3/2013 | Hultell et al. |
| 2013/0114458 A1 | 5/2013 | Fujishima et al. |
| 2013/0142150 A1 | 6/2013 | Zhou et al. |
| 2013/0142160 A1 | 6/2013 | Hoshino et al. |
| 2013/0163550 A1 | 6/2013 | Marinier et al. |
| 2013/0242842 A1 | 9/2013 | Wong |
| 2013/0242937 A1 | 9/2013 | Li et al. |
| 2014/0056374 A1 | 2/2014 | Goransson et al. |
| 2015/0117352 A1* | 4/2015 | Nammi ........................ 370/329 |

FOREIGN PATENT DOCUMENTS

| | | |
|---|---|---|
| JP | 200789113 A | 4/2007 |
| JP | 2011517895 A | 6/2011 |
| JP | 2012506213 A | 3/2012 |
| RU | 2437226 C2 | 12/2011 |
| RU | 2439815 C2 | 1/2012 |
| WO | 2009093662 A1 | 7/2009 |
| WO | 2009120118 A1 | 10/2009 |
| WO | 2011025218 A2 | 3/2011 |
| WO | 2011060299 A2 | 5/2011 |
| WO | 2011100627 A1 | 8/2011 |
| WO | 2011147337 A1 | 12/2011 |
| WO | 2012020552 A1 | 2/2012 |
| WO | 2012044988 A1 | 4/2012 |
| WO | 2013115708 A2 | 8/2013 |
| WO | 2013169201 | 11/2013 |

OTHER PUBLICATIONS

"3rd Generation Partnership Project; Technical Specification Group Radio Access Network;Physical layer procedures (FDD) (Release 11)," 3GPP TS 25.214 V11.4.0, Dec. 2012, 127 pages.

Partial Supplementary European Search Report received in European Application No. 13790784 dated Sep. 8, 2015, 7 pages.

Interdigital Communications et al: "Pilot Design for Four Branch MIMO Transmission for HSDPA", 3GPP Draft; R1-114172, 3GPP TSG-RAN WG1 Meeting #67, San Francisco, CA, USA, Nov. 14-19, 2011, 4 pages.

Ericsson, "Scheduled Common Pilot Performance in a Four Branch MIMO System", 3GPP Draft R1-122808, 3GPP TSG-RAN WG1 #69, Prague, Czech Republic; May 21-25, 2012, 8 pages.

Huawei, at al., "Further Evaluation on Pilot Design for DL MIMO", 3GPP TSG-RAN WG1 Meeting #69, R1-122682, Prague, Czech Republic, May 21-25, 2012, 8 pages.

* cited by examiner

SYSTEMS AND METHODS FOR SCHEDULING MULTIPLE-INPUT AND MULTIPLE-OUTPUT (MIMO) HIGH-SPEED DOWNLINK PACKET ACCESS (HSDPA) PILOT CHANNELS

This application is a continuation of U.S. Non-Provisional application Ser. No. 13/629,280 filed on Sep. 27, 2012, entitled "Systems and Methods for Scheduling Multiple-Input and Multiple-Output (MIMO) High-Speed Downlink Packet Access (HSDPA) Pilot Channels," which claims priority to U.S. Provisional Application No. 61/648,961 filed on May 18, 2012, entitled "Systems and Methods for Scheduling MIMO HSDPA Pilot Channels," both of which are incorporated herein by reference as if reproduced in their entireties.

TECHNICAL FIELD

The present invention relates to systems and methods for wireless communications, and, in particular embodiments, to systems and methods for scheduling multiple-input and multiple-output (MIMO) high-speed downlink packet access (HSDPA) pilot channels.

BACKGROUND

In high-speed downlink packet access (HSDPA) release eleven (rel-11), a 4-branch multiple-input and multiple-output (MIMO) transmission scheme is introduced at the Node B (NB) to support transmission of multiple data streams over multiple antennas. Specifically, the 4-branch MIMO transmission scheme multiplexes multiple transport blocks into two data streams, which are transmitted over four spatial layers. The NB will also transmit four common pilots (CPICH1, CPICH2, CPICH3 and CPICH4) over the four transmit antennas to provide 4-branch MIMO channel estimation for 4-branch MIMO capable user equipments (UEs). UEs configured for higher order MIMO (e.g., higher than 2-branch MIMO) are referred to herein as next-generation UEs. As discussed herein, the terms 'higher order MIMO' and 'multi-branch MIMO' are used synonymously, and refer to any MIMO technique utilizing more than two transmission branches.

One consideration for the higher order MIMO transmission scheme is the increased inter-channel interference experienced by legacy user equipments (UEs) as a result of transmitting the multiple common pilots. Specifically, UEs lacking higher order MIMO functionality (referred to herein as legacy UEs) may not possess the means (e.g., Walsh codes, sufficient number of receive antennas, etc.) for demodulating the multiple common pilots, and consequently may view the common pilots as interference in the code division multiple access (CDMA) downlink channel. To mitigate the interference experienced by legacy UEs, the multiple common pilots may maintain a low transmit-power level. However, in some instances, the low-transmit power of the multiple common pilot channels will not provide sufficiently accurate higher order MIMO channel estimation for the next-generation UEs. Since increasing the transmit-power of the common pilots is undesirable in so far as it would increase the interference experienced by legacy UEs, other mechanisms for improving higher order MIMO channel estimation for next-generation UEs without significantly increasing the interference experienced by legacy UEs are desired.

SUMMARY

Technical advantages are generally achieved, by embodiments of the present invention which describe systems and methods for scheduling MIMO HSDPA pilot channels.

In accordance with embodiments of this disclosure, a method for facilitating channel estimation is provided. In this example, the method comprises transmitting multiple common pilot channels over multiple transmit antennas to one or more next-generation user equipments (UEs). The method further includes sending a high-speed downlink packet access (HSDPA) shared control channel (HS-SCCH) order to the one or more next-generation UEs, where the HS-SCCH order signals transmission of one or more scheduled pilot channels. In one embodiment, the method transmitting the one or more scheduled pilot channels upon receiving a first acknowledgement (ACK) message from a first one of the next-generation UEs. In another embodiment, the method includes transmitting the one or more scheduled pilots when no ACK messages are received after expiration of a timeout period. The one or more scheduled pilots may be transmitted upon scheduling at least one of the one or more next-generation UEs to receive a downstream transmission after expiration of the timeout period. In each of the above-mentioned embodiments, the one or more scheduled pilot channels are transmitted concurrently with the multiple common pilot channels. Apparatus for performing the above-mentioned methods are also provided.

In accordance with other embodiments, a method for transitioning from enhanced multiple-input and multiple-output (MIMO) channel estimation to basic MIMO channel estimation is provided. In this example, the method comprises simultaneously transmitting multiple common pilot channels and one or more scheduled pilot channels to one or more next-generation UEs. The method further includes sending an HS-SCCH order to the one or more next-generation UEs. The HSDPA order signals de-activation of the one or more scheduled pilot channels. In one embodiment, the method further includes de-activating transmission of the one or more scheduled pilot channels upon receiving ACK messages from each of the one or more next-generation UEs. In another embodiment, the method further includes de-activating transmission of the one or more scheduled pilot channels when downstream data transmission to any of the next-generation UEs stops. In yet another embodiment, the method further includes dis-continuing transmission of the one or more scheduled pilot channels upon expiration of a timeout period. Apparatus for performing the above-mentioned methods are also provided.

In select embodiments, power allocation for the common pilots may be lower than power allocation for the scheduled pilots. The scheduled pilots may be selectively transmitted when enhanced higher order MIMO channel estimation for demodulation is desired. Enhanced higher order MIMO channel estimation may enable next-generation UEs to perform demodulation, thereby allowing downlink MIMO transmission and increasing the bit-rate of the downlink transmission. The scheduled pilots may be selectively not transmitted when enhanced higher order MIMO channel estimation for demodulation is not desired, or when higher order MIMO channel estimation obtained from processing the common pilots only is sufficient for demodulation. Channel estimation derived from the common pilots only is referred to as basic higher order MIMO channel estimation. Embodiments of this disclosure may be implemented in Universal Mobile Telecommunications System (UMTS) MIMO systems and devices, such as UMTS NodeBs and UEs that support HSDPA higher-order MIMO, where higher-order MIMO refers to more than 2 transmission branches.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments of this disclosure and are not necessarily drawn to scale.

DETAILED DESCRIPTION OF ILLUSTRATIVE EMBODIMENTS

Figure 1:
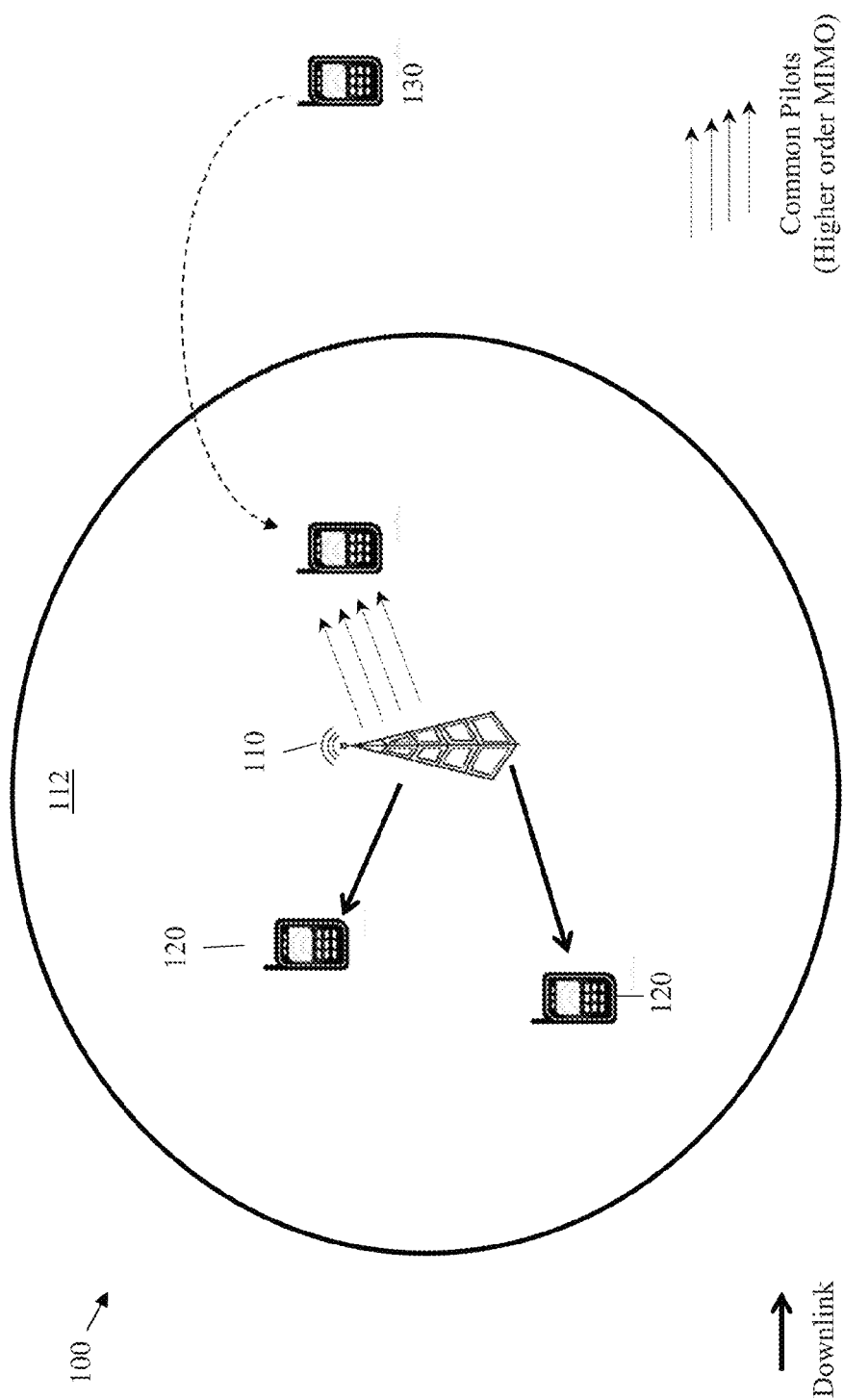
FIG. 1 illustrates an embodiment of a network for communicating data.

The making and using of the presently presented embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One alternative to increasing the transmit power of the common pilots is to transmit one or more additional pilot channels contemporaneously with the common pilots, while continuing to maintain the common pilots at a low-transmit power. These additional pilot channels are commonly known as scheduled common pilot channels (or demodulation pilots), and are referred to herein as scheduled pilots (for short). Hence, the terms 'scheduled common pilot channels', 'demodulation pilots', and 'scheduled pilots' may be used synonymously herein. These one or more scheduled pilots are transmitted over the same transmit antennas used to transmit the common pilots, and serve to augment the higher order MIMO channel estimation provided by the common pilots.

Sufficiently accurate higher order MIMO channel estimation may be provided by transmitting the scheduled pilots together with the common pilots, even while maintaining a relatively low transmit power level for the common pilots (e.g., in order to mitigate the interference experience by legacy UEs). The scheduled pilots are selectively transmitted by the NB to provide accurate channel estimation by next-generation UEs, while the common pilots are transmitted by the NB continuously to allow migrating UEs to perform channel estimation upon entering the NB's coverage area. Selectively transmitting the scheduled pilots includes activating (i.e., transmitting) the scheduled pilots during some periods (e.g., when next-generation UEs are scheduled to receive downlink transmissions, etc.), while deactivating the scheduled pilots during other periods (e.g., to mitigate the interference experienced by legacy UEs when next-generation UEs are not receiving data or are not present in the NBs coverage area, etc.).

Before activating/de-activating the scheduled pilots, the NB may need to send downlink control signaling to next-generation UEs so that the next-generation UEs can modify their channel estimation/de-modulation settings accordingly. For instance, if the scheduled pilots are being activated, then the next-generation UE may need to re-configure its channel estimation technique to one that utilizes both common and scheduled pilots. Conversely, if the scheduled pilots are being deactivated, then the next-generation UE may need to re-configure its channel estimation technique to one that utilizes the common pilots (but does not rely on the scheduled pilots). The NB may elect to activate/de-activate the scheduled pilots in accordance with one or more factors. For instance, the NB may activate the scheduled pilots only when next-generation UEs are scheduled for downstream data transmission, or when transmitting at a certain data rate and/or with certain modulation.

However, there may be some instances where de-activating (i.e., not transmitting) the scheduled pilots is desirable even when the next-generation UEs are present in the NB's coverage area. For instance, if the ratio of legacy UEs to next-generation UEs is high, then the performance benefits derived from improved higher order MIMO channel estimation may be outweighed by the interference costs borne by the legacy UEs as a result of transmitting the scheduled pilots. Accordingly, a mechanism for selectively de-activating scheduled pilots when next-generation UEs are scheduled to receive downlink transmissions is desired.

Aspects of this disclosure provide mechanisms for selectively activating and de-activating scheduled pilots, as well as signaling protocol for supporting the selective activation and de-activation of pilots. Advantageously, the mechanisms allow for scheduled pilots to be transmitted or not transmitted at the discretion of the NB. Further, the signaling protocol ensures that higher order MIMO service is not interrupted, by requiring one or a series of acknowledgements (ACKs) before activating or deactivating the transmission of the scheduled pilots.

FIG. 1 illustrates a network 100 for communicating data. The network 100 comprises a base station (NB) 110 having a coverage area 112, a plurality of legacy user equipments (UEs) 120, and at least one next-generation UE 130. The NB 110 may be any component capable of providing wireless access to the legacy UE 120 and the next-generation UE 130. The NB 110 may provide wireless access by, inter alia, establishing an uplink connection (not shown) and/or a downlink connection (solid lines) with the legacy UEs 120. The legacy UEs 120 may be any component or collection of components that allow a user to establish a wireless connection. In embodiments, the legacy UEs may have fewer than four receive antennas, and consequently may be incapable of establishing multi-channel MIMO downlink connection. In some embodiments, the network 100 may comprise various other wireless devices, such as relays, femtocells, etc. The NB 110 may also provide wireless access to the next-generation UE 130. In embodiments, the next-generation UE 130 may migrate into the coverage area 112, and may perform higher order MIMO channel estimation using the multiple common pilots in an attempt to establish a downlink connection (not shown in FIG. 1).

Figure 2:
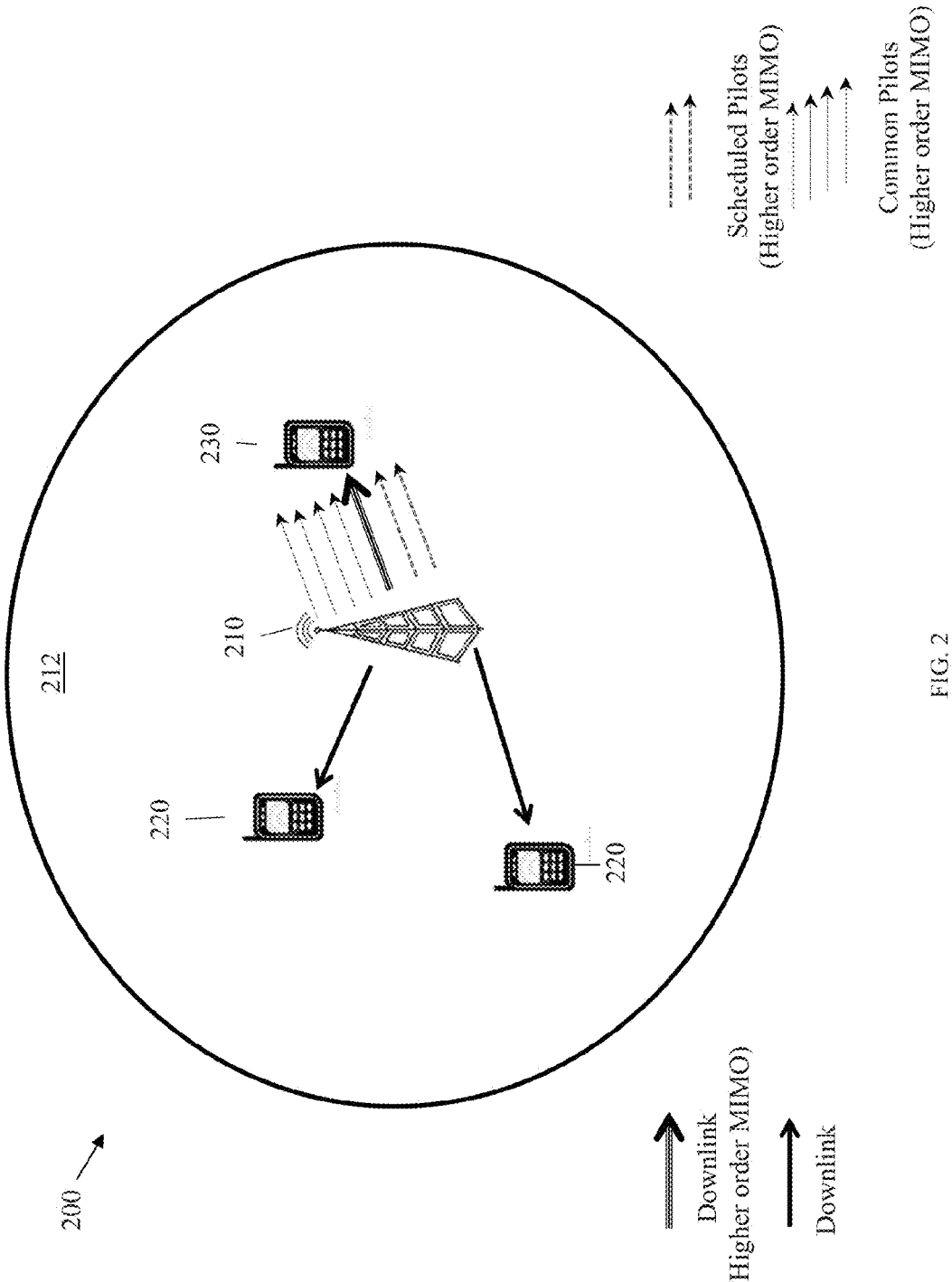
FIG. 2 illustrates another embodiment of a network for communicating data.

FIG. 2 illustrates a network 200 for communicating data. The network 200 may be similar in many respects to the network 100, in that the NB 210 may be configured to provide wireless access to the legacy UEs 220 and the next-generation UE 230. However, unlike the NB 110, the NB 210 has the next-generation UE 230 scheduled to receive a downlink transmission. Further, the NB 210 transmits two scheduled pilots (dashed lines) by virtue of having the next-generation UE 230 scheduled to receive a downlink transmission.

Aspects of the disclosure provide a mechanism (and supporting signaling) for activating the scheduled pilots while next-generation UEs are scheduled to receive downlink transmissions, when doing so is considered advantageous by the network. Other aspects of the disclosure provide a mechanism (and supporting signaling) for de-activating the scheduled pilots. Situations in which de-activating scheduled pilots is advantageous may include situations where the performance benefits derived from improved higher order MIMO channel estimation are outweighed by the interference costs borne by the legacy UEs. For instance, the scheduled pilots may be de-activated to maximize network throughput, or to provide better cell-edge coverage to legacy UEs.

Figure 3:
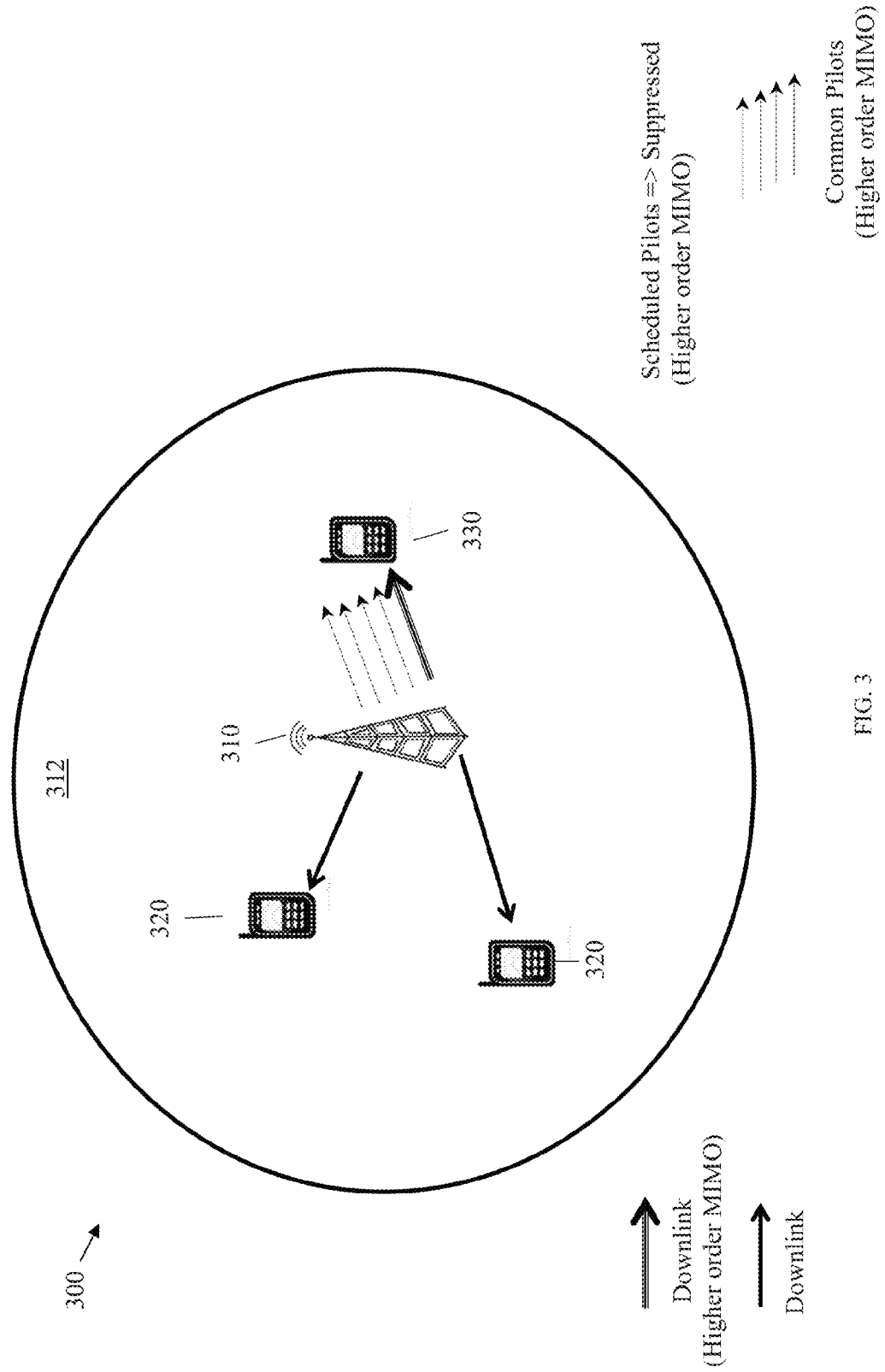
FIG. 3 illustrates yet another embodiment of a network for communicating data.

FIG. 3 illustrates a network 300 for communicating data. The network 300 may be similar in many respects to the network 200, in that both the legacy UEs 320 and the next-generation UE 330 are scheduled to receive downlink transmissions from the NB 310. However, the NB 310 has the capability of activating/de-activating the transmission of the scheduled pilots, and under certain conditions the common pilots are the only higher order MIMO pilot transmission in the coverage area 312. Notably, the legacy UEs 320 will experience less CDMA interference than their counterparts (the legacy UEs 220) as a result of the scheduled pilot transmissions being de-activated in the coverage area 312.

Figure 4:
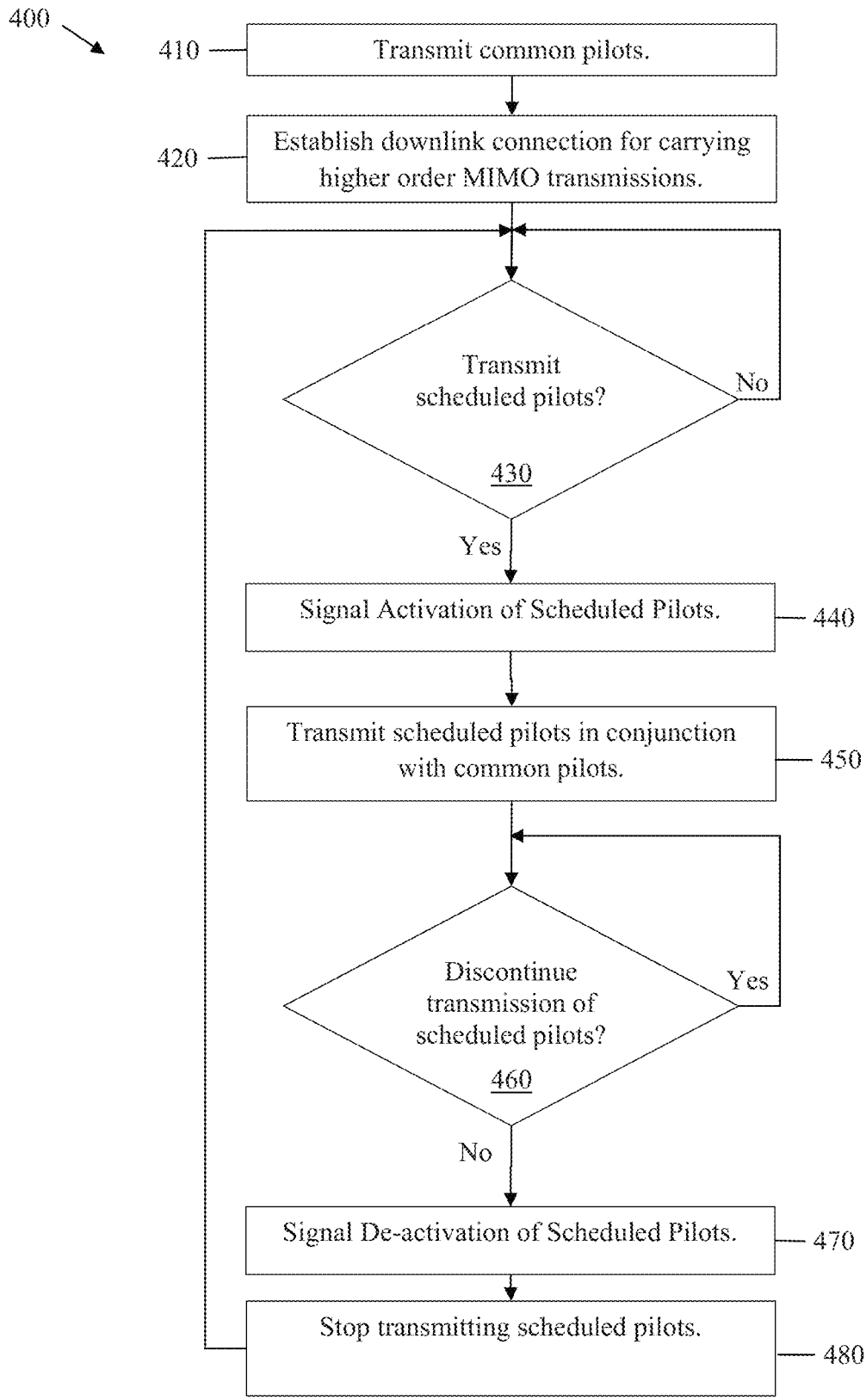
FIG. 4 illustrates a flowchart of an embodiment of a method for establishing higher order MIMO communication.

Markedly, the scheduled pilots are selectively activated/de-activated, meaning that they are transmitted (or not-transmitted) depending on network conditions (e.g., load, downlink service requirements, channel conditions, etc.). FIG. 4 illustrates a method 400 for higher order MIMO communication. The method 400 begins at block 410, where the NB transmits common pilots. The common pilots may be transmitted continuously, so as to allow for migrating next-generation UEs to perform higher order MIMO channel estimation when establishing the downlink connection. Next, the method 400 proceeds to block 420, where the NB establishes one or more downlink connections for carrying higher order MIMO transmissions to one or more next-generation UEs. Thereafter, the method 400 proceeds to step 430, where it is determined whether or not to transmit the scheduled pilots. If the NB decides not to transmit the scheduled pilots, then the method 400 remains at step 430 until such time as the NB decides to transmit the scheduled pilots. If the NB decides to transmit the scheduled pilots, then the method 400 proceeds to step 440, where the NB signals activation of the scheduled pilots to the one or more next generation UEs. Thereafter, the method 400 proceeds to step 450, where the NB transmits scheduled pilots in conjunction with the common pilots. Next, the method 400 proceeds to step 460, where the NB determines whether or not to discontinue transmission of the scheduled pilots. If the NB decides to continue transmission of the scheduled pilots, then the method 400 remains at step 460 until such time as the NB decides to discontinue transmission of the scheduled pilots. If the NB decides to discontinue transmission of the scheduled pilots, then the method 400 proceeds to step 470, where the NB signals de-activation of the scheduled pilots to the one or more next generation UEs. Thereafter, the method 400 proceeds to step 480, wherein the NB stops transmitting the scheduled pilots. After the step 480, the method 400 reverts back to step 430, such that the determination as to whether to transmit the scheduled pilots may be updated in a dynamic fashion.

Figure 5:
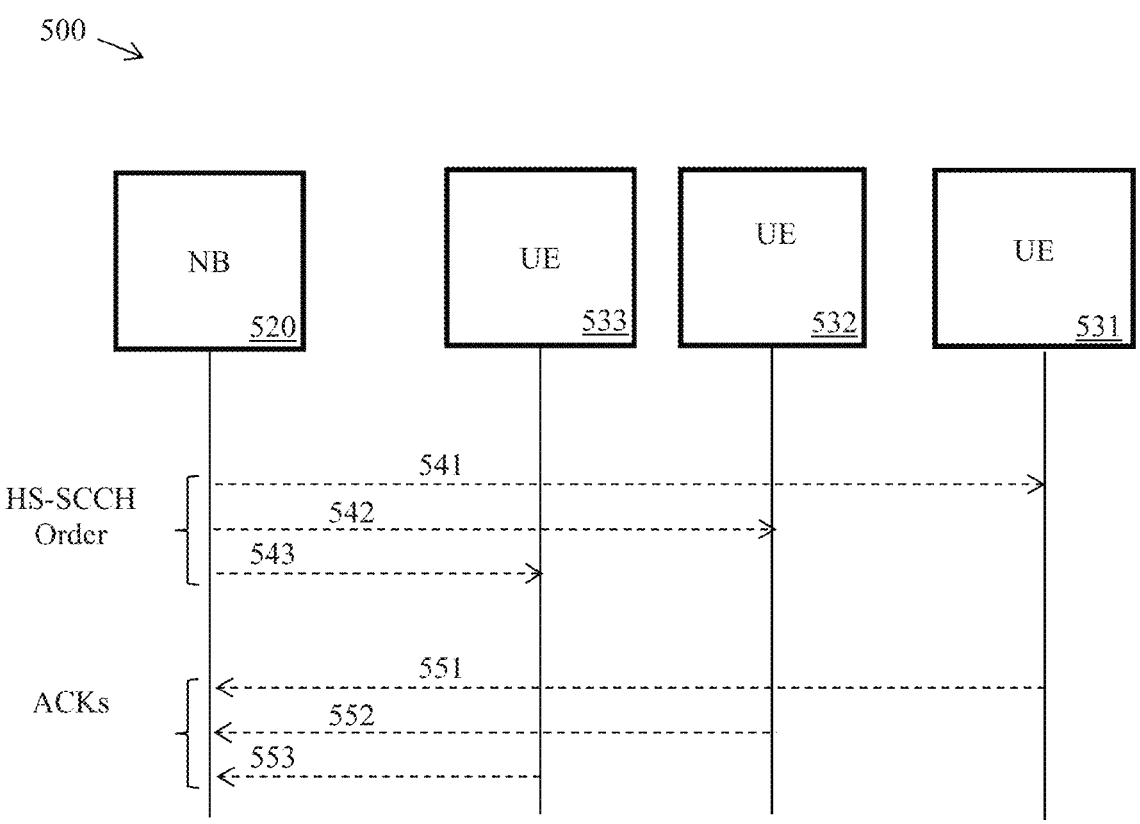
FIG. 5 illustrates a protocol diagram of an embodiment of a communication sequence for scheduled pilot signaling.

Signaling for suppression (or introduction) of the scheduled pilots may be performed via the HSDPA Shared Control CHannel (HS-SCCH). FIG. 5 illustrates a protocol 500 for scheduled pilot signaling between an NB 520 and one or more next-generation UEs 531-533. The protocol 500 includes the communication of a plurality of HS-SCCH orders 541-543 from the NB 520 to the next-generation UEs 531-533. In response, the next-generation UEs 531-533 respond with a plurality of Acknowledgements (ACKs) 551-553. The HS-SCCH orders 541-543 may be communicated via the HS-SCCH, and may indicate the NB's 520 intention to activate or de-activate scheduled pilots. For instance, if scheduled pilots are currently being transmitted, then the HS-SCCH orders 541-543 may indicate an intention to suppress the scheduled pilots after receiving the ACKs 551-553. In such a case, the next-generation UEs 541-543 may transition from enhanced higher order MIMO channel estimation to basic higher order MIMO channel estimation upon receiving the HS-SCCH orders 541-543. On the other-hand, if scheduled pilots are not currently being transmitted, then the HS-SCCH orders 541-543 may indicate an intention to transmit the scheduled pilots. In such a case, the next-generation UEs 541-543 may transition from basic higher order MIMO channel estimation to enhanced higher order MIMO channel estimation upon receiving the HS-SCCH orders 541-543.

Figure 6:
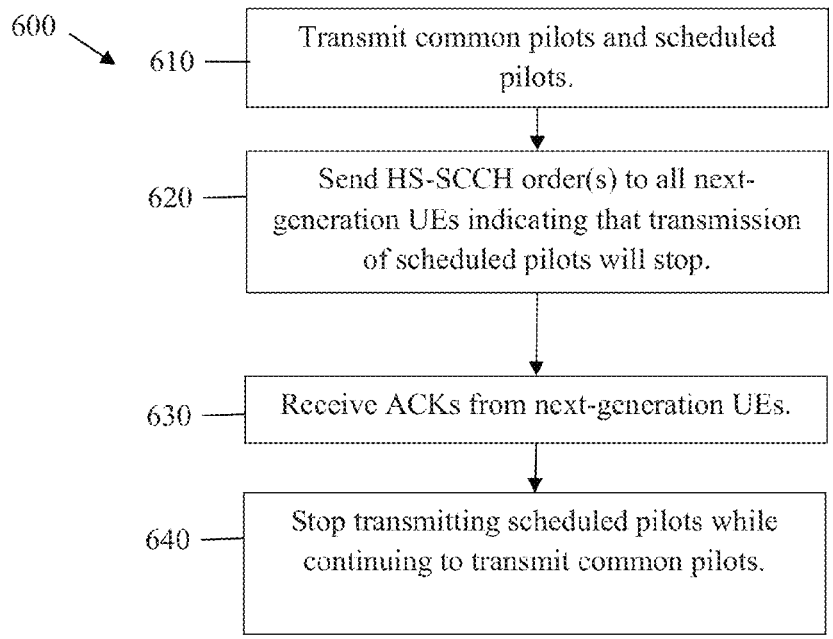
FIG. 6 illustrates a flowchart of an embodiment of a method for transitioning from transmission of common and scheduled pilots to transmission of common pilots only.

FIG. 6 illustrates a method 600 for transitioning from enhanced higher order MIMO channel estimation to basic higher order MIMO channel estimation. As discussed herein, enhanced higher order MIMO channel estimation refers to channel estimation performed in accordance with at least one scheduled pilot channel. In embodiments, enhanced higher order MIMO channel estimation may include instances where channel estimation is performed using only scheduled pilots, as well as instances were channel estimation is performed using scheduled pilots in conjunction with common pilots. The method 600 begins at step 610, where the NB transmits common and scheduled pilots. Next, the method 600 proceeds to step 620, where the NB sends HS-SCCH orders to all next-generation UEs. The HS-SCCH orders indicate that NB will stop transmitting the scheduled pilots at some point in the future. Upon receiving the HS-SCCH order, the next-generation UEs transmit an ACK to the NB, stop demodulating the scheduled pilot channel, and may switch to a channel estimation technique that does not rely on the scheduled pilots (e.g., uses only the common pilots). The next-generation UEs may also change the uplink feedback format upon receiving the HS-SCCH order. Thereafter, the method 600 proceeds to step 630, where the NB receives an acknowledgement from the next-generation UEs. In some embodiments, the NB may wait until an acknowledgement has been received from each next-generation UE before stopping the transmission of the scheduled pilots in order to prevent an interruption in wireless access. That is, the downlink connection may be lost if the transmission of the scheduled pilots is stopped before a next-generation UEs transitions from enhanced higher order MIMO channel estimation to basic higher order MIMO channel estimation.

Figure 7:
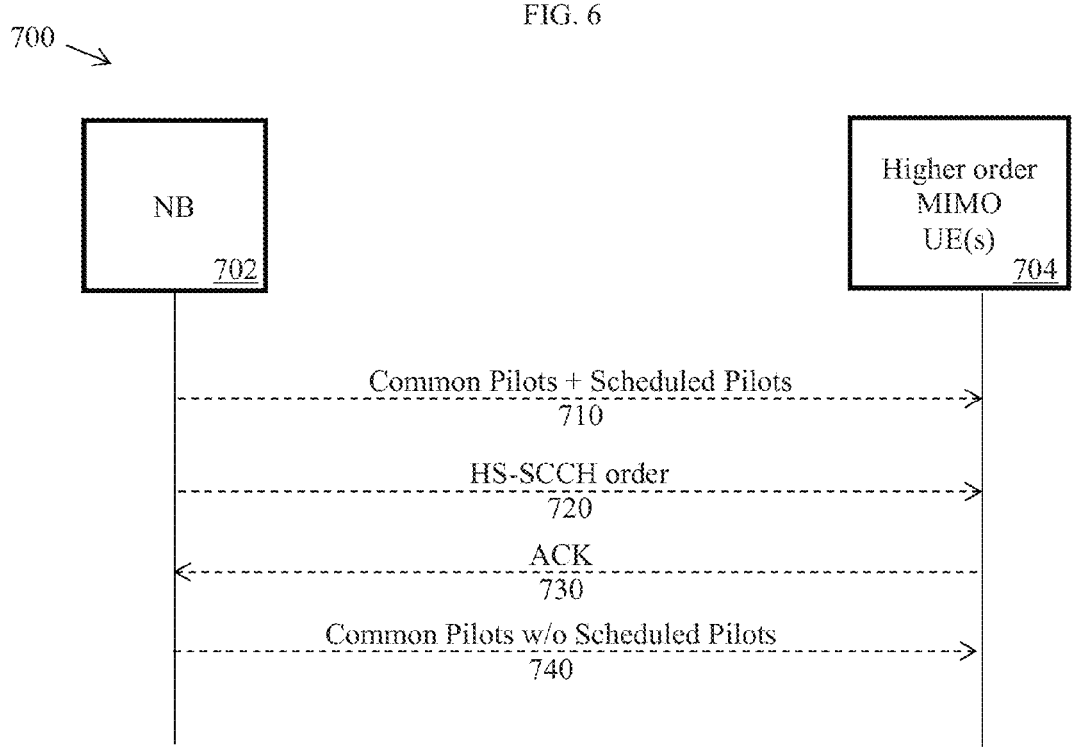
FIG. 7 illustrates a protocol diagram of an embodiment of a communications sequence for transitioning from the transmission of common and scheduled pilots to the transmission of common pilots only.

FIG. 7 illustrates a protocol diagram of an embodiment of a communications sequence 700 for transitioning from enhanced higher order MIMO channel estimation to basic higher order MIMO channel estimation. The communications sequence 700 takes place between a NB 702 and one or more next generation UEs 704, and begins when the NB 702 transmits both common and scheduled pilots 710 to the next generation UEs 704. Thereafter, the NB 702 sends an HS-SCCH order 720 to the higher order MIMO UE(s) 704 indicating that transmission of the scheduled pilots will stop at some point in the future. Thereafter, each of the next-generation UEs 704 transmits an acknowledgment 730 to the NB 702, indicating that the HS-SCCH order 720 was successfully received. Thereafter, the NB 702 de-activates the scheduled pilots.

In an embodiment, the NB 702 may not receive an ACK from each next-generation UE. In such embodiments, the NB 702 may continue to transmit the scheduled pilots so long as at least one next-generation UE is scheduled to receive downlink data transmissions. Once all next-generation UEs have either provided an ACK, or stopped receiving downlink data transmissions, the NB 702 may de-activate the scheduled pilots.

Figure 8:
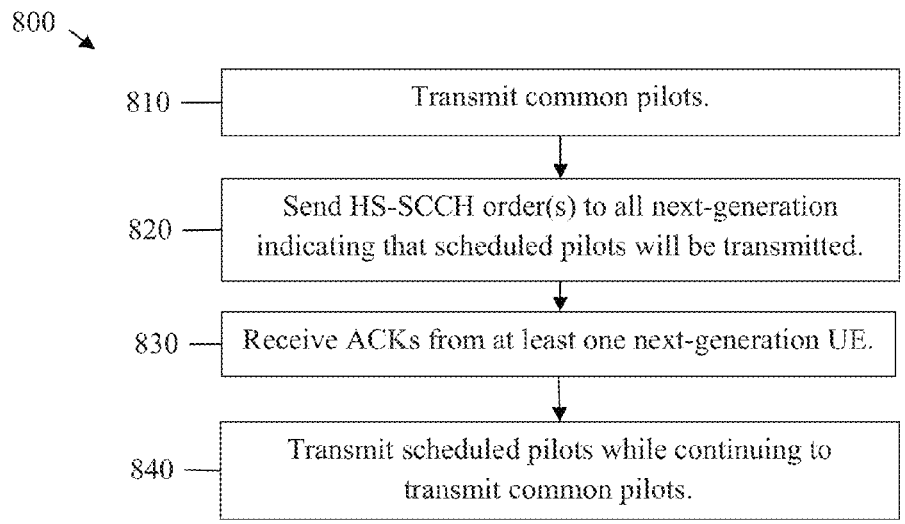
FIG. 8 illustrates a flowchart of an embodiment of a method for transitioning from the transmission of common pilots only to the transmission of common and scheduled pilots.

FIG. 8 illustrates a method 800 for transitioning from basic higher order MIMO channel estimation to enhanced higher order MIMO channel estimation. The method 800 begins at step 810, where the NB transmits common pilots. Next, the method 800 proceeds to step 820, where the NB sends HS-SCCH orders to all next-generation UEs. The HS-SCCH orders indicate that the NB will begin transmitting the scheduled pilots. Upon receiving the HS-SCCH order, next-generation UEs may transmit an ACK to the NB and begin monitoring and/or receiving scheduled pilot channels. Upon detection/reception of the scheduled pilots, next-generation UEs may switch to a channel estimation technique that utilizes both common and scheduled pilots. The UE may also change the uplink feedback format upon receiving the HS-SCCH order. Next, the method 800 proceeds to step 830, where the NB receives an ACK message from at least one or more next-generation UEs. Thereafter, the method 800 proceeds to step 840, where the NB begins transmitting the scheduled pilots in addition to the common pilots. Notably, transmission of the scheduled pilots does not inhibit basic higher order MIMO channel estimation, and therefore the NB does not need to wait for an ACK message from each next-generation UE prior to transmitting the scheduled pilots.

In an embodiment, the NB 802 may not receive an ACK from each next-generation UE to which an HS-SCCH order was sent. This does not affect the NB's 802 activation of the scheduled pilots because the NB is configured to begin transmitting the scheduled pilots as soon as the first ACK is received, and therefore does not need to receive an ACK from every next-generation UE before activating the scheduled pilots. In another embodiment, the NB 802 may not receive an ACK from any of the next-generation UEs to which an HS-SCCH order was sent. In such embodiments, the NB will wait for ACK reception, and after a certain configurable time period (e.g., a time-out period), the NB will activate the scheduled pilots when starting the transmission of the downlink data channels.

Figure 9:
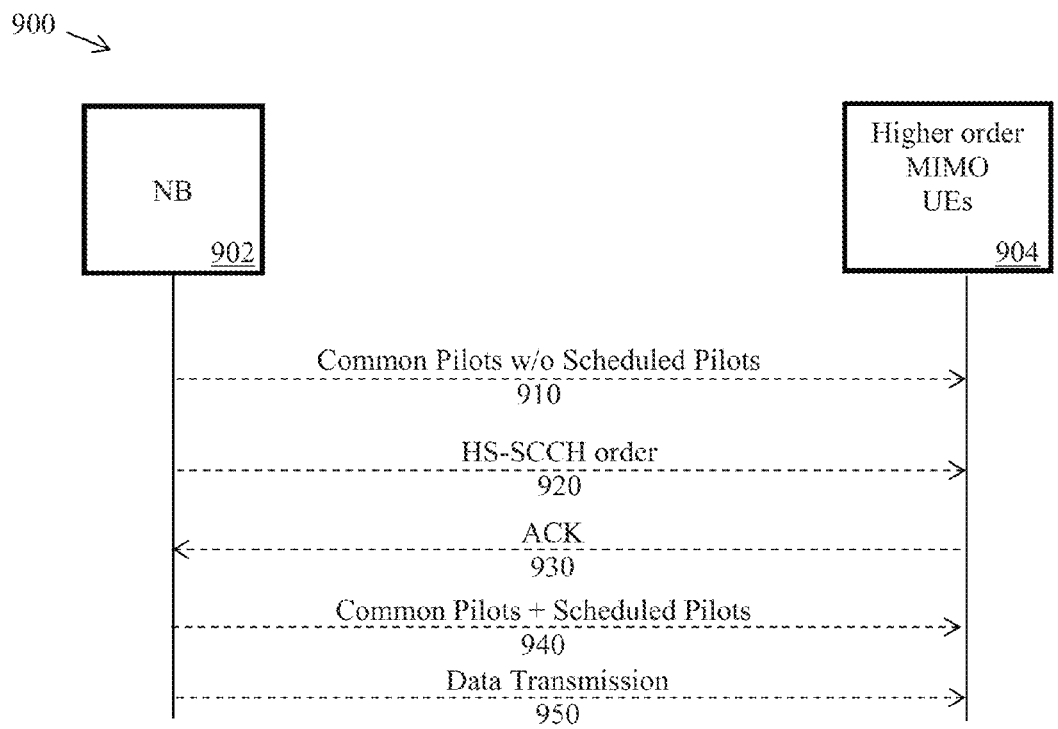
FIG. 9 illustrates a protocol diagram of an embodiment of a communications sequence for transitioning from the transmission of common pilots only to the transmission of common and scheduled pilots.

FIG. 9 illustrates a protocol diagram of an embodiment of a communications sequence 900 for transitioning from basic higher order MIMO channel estimation to enhanced higher order MIMO channel estimation. The communications sequence 900 takes place between a NB 902 and one or more next generation UEs 904, and begins when the NB 902 transmits common pilots 910 to the next generation UEs 904 without transmitting scheduled pilots. Thereafter, the NB 902 sends an HS-SCCH order 920 to the higher order MIMO UEs 904 indicating that transmission of the scheduled pilots will begin at some point in the future. Thereafter, the next-generation UEs 904 transmit acknowledgments to the NB 902, indicating that the HS-SCCH order 920 was successfully received. The acknowledgment 930 is the first acknowledgment to be received by NB 902. Thereafter, the NB 902 activates the scheduled pilots by transmitting both the common and scheduled pilots 940 to the next-generation UEs 904. Subsequently, the NB 902 performs a data transmission 950, which the next-generation UEs receive/process in accordance with enhanced higher order MIMO channel estimation.

HS-SCCH orders may be defined in 3 GPP Technical Specifications 25.212, and may be used by the NB to order a UE action. Tables 1 and 2 illustrate examples of HS-SCCH orders that may be used to signal the change in the transmission of the pilot channels.

TABLE 1

| | | | | 1 Tx on Antenna 1 and Antenna 2 with Beamforming | 2 Single Tx: on Antenna 1 with no | 3 Single Tx on Antenna 2 with no |
|---|---|---|---|---|---|---|
| $x_{eodt1}$, | Order Type $x_{ord.1}$, $x_{ord.2}$, | Order Mapping | | Activation States A = Activate; D = De-activate | | |
| $x_{eodt2}$ | $x_{ord.3}$ | $x_{ord.1}$ $x_{ord.2}$ $x_{ord.3}$ | | (Note 1) | S-DPCCH | S-DPCCH |
| 01 | 011 | 1 1 1 | | A | D | D |
| | | 0 0 1 | | D | A | D |
| | | 0 1 0 | | D | D | A |
| | | 1 0 1 | | Unused (Reserved) | | |
| | | 1 1 0 | | Unused (Reserved) | | |

TABLE 1-continued

| | | | Activation States A = Activate; D = De-activate | | |
|---|---|---|---|---|---|
| | Order Type $X_{ord.1}$, $X_{ord.2}$, | | 1 Tx on Antenna 1 and Antenna 2 with | 2 Single Tx: on Antenna 1 | 3 Single Tx on Antenna 2 |
| $X_{eodt1}$, | | Order Mapping | Beamforming | with no | with no |
| $X_{eodt2}$ | $X_{ord.3}$ | $X_{ord.1}$ $X_{ord.2}$ $X_{ord.3}$ | (Note 1) | S-DPCCH | S-DPCCH |
| | | 0  0  0 | Unused (Reserved) | | |
| | | 0  1  1 | Unused (Reserved) | | |
| | | 1  0  0 | Unused (Reserved) | | |

TABLE 2

| Order Type $X_{ord.1}$, $X_{ord.2}$, | | Order Mapping | | | Activation States A = Activate; |
|---|---|---|---|---|---|
| $X_{ord.1}$, $X_{ord.2}$ | $X_{ord.3}$ | $X_{ord.1}$ | $X_{ord.2}$ | $X_{ord.3}$ | D = De-activate |
| 11 | 010 | 1 | 1 | 1 | Unused (Reserved) |
| | | 0 | 0 | 1 | Unused (Reserved) |
| | | 0 | 1 | 0 | Unused (Reserved) |
| | | 1 | 0 | 1 | Unused (Reserved) |
| | | 1 | 1 | 0 | Unused (Reserved) |
| | | 0 | 0 | 0 | Unused (Reserved) |
| | | 0 | 1 | 1 | Unused (Reserved) |
| | | 1 | 0 | 0 | Unused (Reserved) |

Table 1 provides a first example of an HS-SCCH order to be used for pilot channel signaling. Some orders may be presently used to achieve uplink (UL) closed-loop transmit diversity (CLTD), and can be also re-used for scheduled pilot activation/de-activation signaling. Unused orders may be used for scheduled pilot activation/de-activation signaling. Table 2 provides a second example of HS-SCCH order to be used for pilot channel signaling. In Table 2 a new order type is used, and any of the unused orders can be used for scheduled pilot activation/de-activation signaling.

In an embodiment, a NB may transmit common pilot channels at all times. In the same or other embodiments, the NB may stop transmitting scheduled pilots and the next-generation UEs perform basic higher order MIMO channel estimation; and the NB may transmit scheduled pilots when the next-generation UEs perform enhanced higher order MIMO channel estimation. Signaling related to transitioning to/from enhanced higher order MIMO channel estimation is discussed above. In such signaling, the ACK messages and the HS-SCCH orders may generally have arbitrary timings.

In some embodiments, some scheduled pilots may be non-precoded pilots, and may be controlled by the network. HS-SCCH orders may be used to change the activation status of scheduled pilots (including scheduled non-precoded pilots). If activated, scheduled pilots may be scheduled together with HS-PDSCH of a UE configured for 4 branch MIMO. In some embodiments, a NB may wait to receive ACKs of the HS-SCCH order before activating/deactivating the scheduled pilots. In some embodiments, at least one scheduled non-precoded pilots are supported. In other embodiments, two or more scheduled non-precoded pilots are supported. In embodiments, the spreading code indices and power offsets for newly defined pilots are configured using RRC signaling. In embodiments, a third and fourth common pilot may use a common power offset, and the two scheduled non-precoded pilots may also use a common power offset. Although aspects of this disclosure are generally discussed in the context of higher order or higher order MIMO (e.g., 4-branch MIMO, etc.), principles discussed herein may also be applicable to other types of network configurations where additional pilot channels are activated/de-activated by means of HS-SCCH orders.

Figure 10:
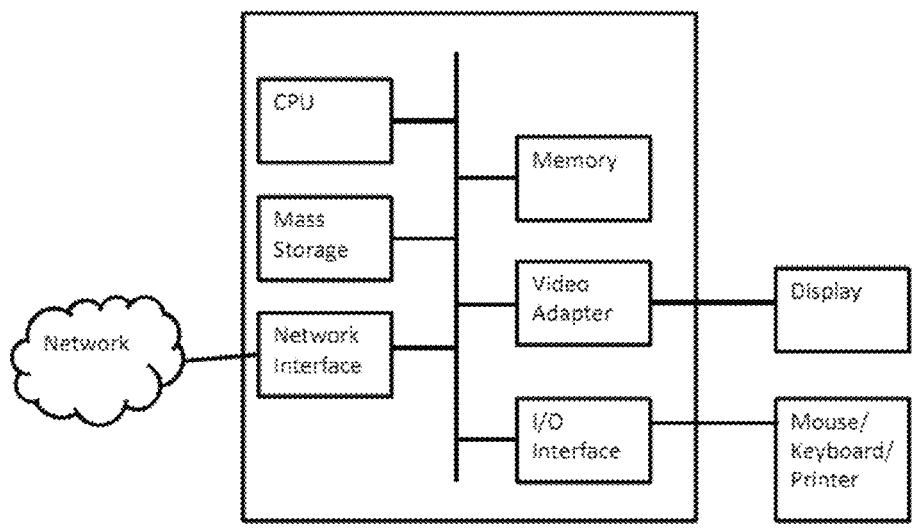
FIG. 10 illustrates a block diagram of an embodiment processing system.

FIG. 10 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an input/output (I/O) interface connected to a bus. The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like. The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 11:
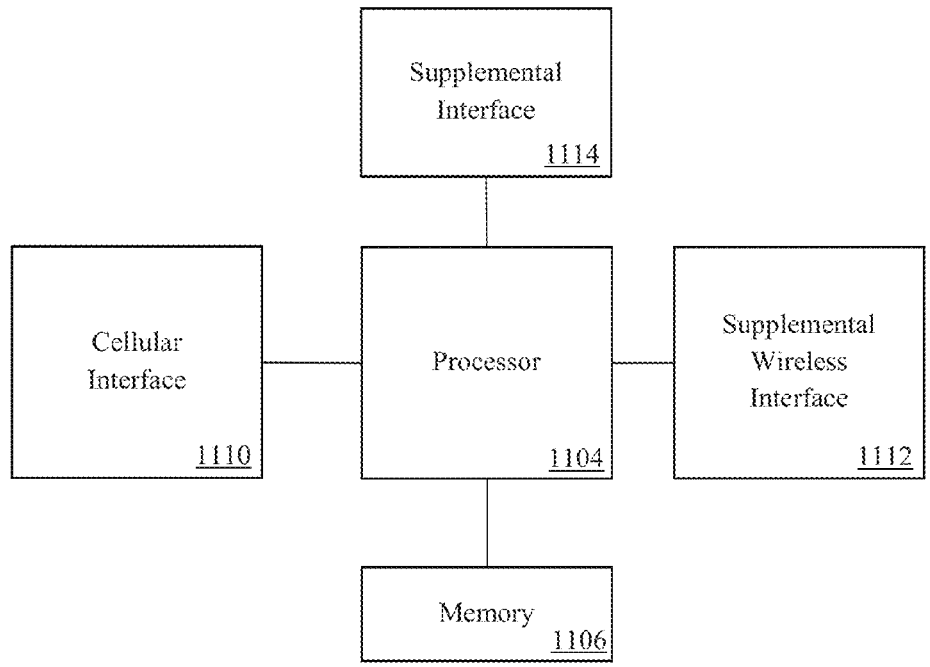
FIG. 11 illustrates a block diagram of an embodiment communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, a cellular interface 1110, a supplemental wireless interface 1112, and a supplemental interface 1114, which may (or may not) be arranged as shown in FIG. 11. The processor 1104 may be any component capable of performing computations and/or other processing related tasks, and the memory 1106 may be any component capable of storing programming and/or instructions for the processor 1104. The cellular interface 1110 may be any component or collection of components that allows the communications device 1100 to communicate using a cellular signal, and may be used to receive and/or transmit information over a cellular connection of a cellular network. The supplemental wireless interface 1112 may be any component or collection of components that allows the communications device 1100 to communicate via a non-cellular wireless protocol, such as a Wi-Fi or Bluetooth protocol, or a control protocol. The supplemental interface 1114 may be component or collection of components that allows the communications device 1100 to communicate via a supplemental protocol, including wire-line protocols. In embodiments, the supplemental interface 1114 may allow the device 1100 to communicate with a backhaul network.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating pilot signaling, the method comprising:
   transmitting, by a node B (NodeB), pilot channel signaling in a carrier over at least a first antenna port and a second antenna port, wherein the pilot channel signaling communicated over the first antenna port includes primary common pilot channel (P-CPICH) signaling;
   determining, by the NodeB, whether de-modulation common pilot channel (D-CPICH) signaling in the carrier has been activated or deactivated on at least one of a third antenna port and a fourth antenna port through high-speed downlink packet access (HSDPA) shared control channel (HS-SCCH) orders; and
   transmitting, by the NodeB, the D-CPICH signaling over at least one of the third antenna port and the fourth antenna port when the D-CPICH signaling has been activated on at least one of the third antenna port and the fourth antenna port through the HS-SCCH orders.

2. The method of claim 1, further comprising:
   ceasing, by the NodeB, transmission of the D-CPICH signaling over at least one of the third antenna port and the fourth antenna port when the D-CPICH signaling has been de-activated on at least one of the third antenna port and the fourth antenna port through the HS-SCCH orders.

3. The method of claim 1, wherein transmitting the D-CPICH signaling over at least one of the third antenna port and the fourth antenna port when the D-CPICH signaling has been activated on at least one of the third antenna port and the fourth antenna port comprises:
   transmitting the D-CPICH signaling on one or both of the third antenna port and the fourth antenna port.

4. The method of claim 1, wherein the HS-SCCH orders dynamically activate or deactivate the D-CPICH pilot signaling for a subset of antenna ports on the carrier.

5. The method of claim 1, wherein the HS-SCCH orders for activating or deactivating the D-CPICH signaling are user equipment (UE) specific.

6. A method for pilot configuration in support of a multiple input multiple output (MIMO) mode with four transmit antennas operating in a High-Speed Downlink Shared channel (HS-DSCH) of a cell, the method comprising:
   transmitting, by a node B (NodeB), de-modulation common pilot channel (D-CPICH) signaling over at least one antenna port;
   activating or deactivating, by the NodeB, D-CPICH signaling on one or both of a third antenna port and a fourth antenna port through high-speed downlink packet access (HSDPA) shared control channel (HS-SCCH) orders; and
   transmitting, by the NodeB, the D-CPICH signaling over one or both of the third antenna port and the fourth antenna port when the D-CPICH signaling is activated.

7. The method of claim 6, further comprising:
   ceasing, by the NodeB, transmission of pilot channel signaling over at least one of the third antenna port and the fourth antenna port when pilot channel signaling has been de-activated on at least one of the third antenna port and the fourth antenna port through the HS-SCCH orders.

8. The method of claim 6, wherein the HS-SCCH orders for activating or deactivating the D-CPICH signaling are UE-specific.

9. The method of claim 6, wherein activating or deactivating the D-CPICH signaling on one or both of the third antenna port and the fourth antenna port through the HS-SCCH orders comprises:
   sending, by the NodeB, an HS-SCCH frame containing an order for activating or deactivating the D-CPICH signaling.

10. The method of claim 6, wherein the D-CPICH signaling is transmitted over at least one of the third antenna port and the fourth antenna port before any acknowledgment (ACK) messages corresponding to the HS-SSCH orders are received from user equipments (UEs) in the cell.

11. The method of claim 6, wherein the D-CPICH signaling is transmitted over both the third antenna port and the fourth antenna port before any acknowledgment (ACK) messages corresponding to the HS-SSCH orders are received from user equipments (UEs) in the cell.

12. A node B (NodeB) adapted to operate in a multiple input multiple output (MIMO) mode with four transmit antennas operating in a High-Speed Downlink Shared channel (HS-DSCH) a cell, the NodeB comprising:
   a processor; and
   a non-transitory computer readable storage medium storing programming for execution by the processor, the programming including instructions to:
      transmit de-modulation common pilot channel (D-CPICH) signaling over at least one antenna port;

activate or deactivate D-CPICH signaling on one or both of a third antenna port and a fourth antenna port through high-speed downlink packet access (HS-DPA) shared control channel (HS-SCCH) orders; and transmit the D-CPICH signaling over one or both of the third antenna port and the fourth antenna port when the D-CPICH signaling is activated through the HS-SCCH orders.

13. The NodeB of claim 12, wherein the programming further includes instructions to:

cease transmission of pilot channel signaling over at least one of the third antenna port and the fourth antenna port when pilot channel signaling has been de-activated on at least one of the third antenna port and the fourth antenna port through the HS-SCCH orders.

14. The NodeB of claim 12, wherein the HS-SCCH orders for activating or deactivating the D-CPICH signaling are UE-specific.

15. The NodeB of claim 12, wherein the instructions to activate or deactivate the D-CPICH signaling on one or both of the third antenna port and the fourth antenna port through the HS-SCCH orders includes instructions to:

send an HS-SCCH frame containing an order for activating or deactivating the D-CPICH signaling.

16. The NodeB of claim 12, wherein the D-CPICH signaling is transmitted over at least one of the third antenna port and the fourth antenna port before any acknowledgment (ACK) messages corresponding to the HS-SSCH orders are received from user equipments (UEs) in the cell.

17. The NodeB of claim 12, wherein the D-CPICH signaling is transmitted over both the third antenna port and the fourth antenna port before any acknowledgment (ACK) messages corresponding to the HS-SSCH orders are received from user equipments (UEs) in the cell.

18. A method for communicating pilot signaling, the method comprising:

transmitting, by a node B (NodeB), pilot channel signaling in a carrier over at least a first antenna port and a second antenna port, wherein the pilot channel communicated over the first antenna port and the second antenna port includes de-modulation common pilot channel (D-CPICH) signaling;

determining, by the NodeB, whether pilot channel signaling in the carrier has been activated or deactivated on at least one of a third antenna port and a fourth antenna port through high-speed downlink packet access (HS-DPA) shared control channel (HS-SCCH) orders; and transmitting, by the NodeB, pilot channel signaling over at least one of the third antenna port and the fourth antenna port when pilot channel signaling has been activated on at least one of the third antenna port and the fourth antenna port through the HS-SCCH orders.

19. A method for communicating pilot signaling, the method comprising:

transmitting, by a node B (NodeB), pilot channel signaling in a carrier over at least a first antenna port and a second antenna port;

determining, by the NodeB, whether pilot channel signaling in the carrier has been activated or deactivated on at least one of a third antenna port and a fourth antenna port through high-speed downlink packet access (HS-DPA) shared control channel (HS-SCCH) orders; and transmitting, by the NodeB, pilot channel signaling over at least one of the third antenna port and the fourth antenna port when pilot channel signaling has been activated on at least one of the third antenna port and the fourth antenna port through the HS-SCCH orders, wherein the pilot channel communicated over the third antenna port and the fourth antenna port includes de-modulation common pilot channel (D-CPICH) signaling, and wherein the D-CPICH signaling is transmitted over both the third antenna port and the fourth antenna port before any acknowledgment (ACK) messages corresponding to the HS-SSCH orders are received from user equipments (UEs).

* * * * *

UNITED STATES PATENT AND TRADEMARK OFFICE
CERTIFICATE OF CORRECTION

| | |
|---|---|
| PATENT NO. | : 9,461,795 B2 |
| APPLICATION NO. | : 14/523316 |
| DATED | : October 4, 2016 |
| INVENTOR(S) | : Carmela Cozzo et al. |

It is certified that error appears in the above-identified patent and that said Letters Patent is hereby corrected as shown below:

In the Claims

In Col. 12, line 9, claim 4, delete "pilot".

Signed and Sealed this
Twentieth Day of December, 2016

Michelle K. Lee
*Director of the United States Patent and Trademark Office*